United States Patent
Kowalski et al.

(10) Patent No.: US 10,455,607 B2
(45) Date of Patent: Oct. 22, 2019

(54) COMMUNICATION METHODS AND APPARATUS EMPLOYING RATELESS CODES

(71) Applicant: SHARP Laboratories of America, Inc., Camas, WA (US)

(72) Inventors: John Michael Kowalski, Camas, WA (US); Toshizo Nogami, Vancouver, WA (US); Jia Sheng, Vancouver, WA (US); Zhanping Yin, Vancouver, WA (US)

(73) Assignee: Sharp Laboratories of America, Inc., Vancouver, WA (US)

( * ) Notice: Subject to any disclaimer, the term of this patent is extended or adjusted under 35 U.S.C. 154(b) by 0 days.

(21) Appl. No.: 15/591,719

(22) Filed: May 10, 2017

(65) Prior Publication Data
US 2017/0332400 A1    Nov. 16, 2017

Related U.S. Application Data

(60) Provisional application No. 62/335,509, filed on May 12, 2016.

(51) Int. Cl.
*H04L 1/00* (2006.01)
*H04L 1/18* (2006.01)
(Continued)

(52) U.S. Cl.
CPC ....... *H04W 72/1289* (2013.01); *H04L 1/0003* (2013.01); *H04L 1/0041* (2013.01); *H04L 1/0045* (2013.01); *H04L 1/0057* (2013.01); *H04L 1/0065* (2013.01); *H04L 1/1816* (2013.01); *H04L 5/0048* (2013.01); *H04W 24/08* (2013.01); *H04W 72/14* (2013.01)

(58) Field of Classification Search
CPC ..... H04L 1/0003; H04L 1/0009; H04L 1/004; H04L 1/0041; H04L 1/0045; H04L 1/0046; H04L 1/0057; H04L 1/0065; H04L 1/1816; H04L 5/0048; H04W 24/08; H04W 72/14
See application file for complete search history.

(56) References Cited

U.S. PATENT DOCUMENTS 6,856,263 B2   2/2005  Shokrollahi et al.
8,670,377 B2*  3/2014  Yi .................. H04L 1/1812
                                                    370/328
(Continued)

FOREIGN PATENT DOCUMENTS

WO    WO 2008/079222 A1   7/2008
WO    WO 2017/035727 A1   3/2017

OTHER PUBLICATIONS

International Search Report and Written Opinion dated Aug. 7, 2017 in PCT application PCT/US2017/31910.
(Continued)

*Primary Examiner* — Eric Nowlin
(74) *Attorney, Agent, or Firm* — Nixon & Vanderhye P.C.

(57) ABSTRACT

A wireless terminal and a node employed in a wireless communications system comprise an outer coding unit configured to use a code with properties akin to Raptor codes as outer erasure codes; and an inner coding unit configured to use an LDPC code as pre-code. The wireless terminal and the node use a code with properties akin to Raptor codes as outer erasure codes, and use the LDPC code as a pre-code.

16 Claims, 3 Drawing Sheets

(51) Int. Cl.
    *H04L 5/00*     (2006.01)
    *H04W 24/08*    (2009.01)
    *H04W 72/12*    (2009.01)
    *H04W 72/14*    (2009.01)

(56) References Cited

U.S. PATENT DOCUMENTS

| | | | | |
|---|---|---|---|---|
| 8,929,354 | B2* | 1/2015 | Pettersson | H04W 72/0446 |
| | | | | 370/348 |
| 9,591,661 | B2* | 3/2017 | Kodali | H04W 72/1278 |
| 10,004,060 | B2* | 6/2018 | Le | H04W 72/0406 |
| 10,009,152 | B2* | 6/2018 | Maaref | H04L 1/0057 |
| 2004/0075593 | A1 | 4/2004 | Shokrollahi et al. | |
| 2007/0223620 | A1* | 9/2007 | Kalhan | H04L 1/1867 |
| | | | | 375/295 |
| 2009/0310554 | A1 | 12/2009 | Sun et al. | |
| 2010/0037056 | A1 | 2/2010 | Follis et al. | |
| 2013/0100936 | A1* | 4/2013 | Pettersson | H04W 72/0446 |
| | | | | 370/336 |
| 2013/0182653 | A1* | 7/2013 | Earnshaw | H04L 1/1822 |
| | | | | 370/329 |
| 2014/0135027 | A1* | 5/2014 | Kodali | H04W 72/1278 |
| | | | | 455/452.1 |
| 2015/0282148 | A1* | 10/2015 | Le | H04W 72/0406 |
| | | | | 370/329 |
| 2015/0312074 | A1* | 10/2015 | Zhu | H04L 27/2627 |
| | | | | 370/329 |
| 2015/0358113 | A1 | 12/2015 | Callard et al. | |
| 2017/0310417 | A1* | 10/2017 | Jung | H04L 1/18 |
| 2017/0331573 | A1* | 11/2017 | Li | H04J 1/04 |
| 2018/0048421 | A1* | 2/2018 | Yeo | H04L 1/0046 |
| 2018/0070265 | A1* | 3/2018 | Seo | H04J 11/00 |
| 2019/0075591 | A1* | 3/2019 | Sun | H04J 11/004 |

OTHER PUBLICATIONS

3GPP TSG-RAN WG1 #84b R1-162397, Qualcomm Incorporated, "Outer erasure code", Busan, Korea, Apr. 11-15, 2016, 3 pages.
Shokrollahi, "Raptor Codes", http://algo.epfl.ch/_media/en/output/presentations/raptor-bangalore.pdf, Dec. 2005, 99 pages.
Shokrollahi, "Raptor Codes", IEEE Transactions on Information Theory, vol. 52, No. 6, Jun. 2006, pp. 2551-2567, 17 pages.
3GPP TS 36.213 V13.1.1; Technical Specification; 3$^{rd}$ Generation Partnership Project; Technical Specification Group Radio Access Network; Evolved Universal Terrestrial Radio Access (E-UTRA); Physical Layer Procedures (Release 13) (Mar. 2016), 361 pages.
3GPP TSG RAN WG1 Meeting #84bis, "RAN1 Chairman's Notes", Busan, Korea, Apr. 11-15, 2016, 120 pages.
International Preliminary Report on Patentability dated Nov. 13, 2018 in PCT application PCT/US2017/31910.

* cited by examiner

COMMUNICATION METHODS AND APPARATUS EMPLOYING RATELESS CODES

This application claims the priority and benefit of U.S. Provisional Patent application 62/335,509, entitled "COMMUNICATION METHODS AND APPARATUS EMPLOYING RATELESS CODES", filed May 12, 2016, which is incorporated herein by reference in its entirety.

TECHNICAL FIELD

The technology relates to wireless communications, and particularly coding and encoding apparatus and methods for telecommunications such as wireless communications.

BACKGROUND

In a typical cellular radio system, wireless terminal(s) communicates via a Radio Access Network (RAN) to one or more Core Networks (CN). The wireless terminal is also known as mobile station and/or User Equipment (UE), such as mobile telephones, cellular telephones, smart phones, tablet computers and laptops with wireless capability. The user equipment's may be, for example, portable, pocket-storable, hand-held, computer-comprised, or car-mounted mobile devices which communicate voice and/or data via the RAN.

The RAN covers a geographical area via cells, where each cell is being served by a base station, e.g., a Radio Base Station (RBS), which in some networks is also called NodeB, B node, evolved Node B (eNB) or Base Transceiver Station (BTS). The term base station will be used in the following when referring to any of the above examples. From a user equipment perspective the network is represented by a number of cells.

Various generations of mobile communication systems have evolved from the Global System for Mobile Communications (GSM). The Third Generation Partnership Project (3GPP) has undertaken to evolve further the earlier technologies. Currently for "New Radio" (NR), the name given for 5G technology to be standardized by 3GPP, is envisioning 3 main technical areas in which NR will be standardized: Enhanced Mobile Broadband (eMBB), Massive Machine Type Communication (mMTC), and URLLC (Ultra-Reliable and Low Latency Communications).

It has been discussed the use of Outer Erasure Codes for New Radio. The use cases therein envisioned for outer erasure codes were:

Outer erasure code for bursty puncturing/interference mitigation/recovery:
  To sustain eMBB spectrum efficiency and other QoS in the presence of URLLC bursty puncturing/interference
  To combat WiFi-type bursty interference in unlicensed band
  To enable efficient spectrum sharing between low latency high priority and normal latency low priority users in a shared spectrum access scenario
  To sustain eMBB spectrum efficiency in the presence different types of bursty interference (either from future 5G waveforms and or in potential future deployment scenarios)
Outer erasure code to decouple bursty interference/puncturing recovery process from regular physical (PHY) layer demod/decode and PHY layer HARQ processing:
  To support for pipeline processing and low latency decoding at PHY to enable single interlace HARQ (as oppose to deep interleaving, which introduces delay and buffering)
  To recover lost code blocks due to bursty puncturing at MAC layer and decouple the code block (CB) erasure recover from PHY layer HARQ process
Outer erasure code to mitigate bursty interference/puncturing with low uplink feedback and downlink signaling overhead:
  To reduce the amount of CB-level ack information feedback (only number of CB parities needed instead of CB Ack bitmap needs to be fed back)
  To reduce DL control overhead for PHY HARQ process management
Outer erasure code to reduced latency and buffering:
  Outer erasure code to enable fast PHY HARQ turnaround.
  Outer erasure code across multiple carriers/multiple HARQ interlaces to reduce ARQ latency and buffering due to reordering.
Outer erasure code over broadcast channel to combat bursty interference, time selective fading and shadowing.

Candidates for fifth generation (5G) new RAT data transmission are identified as the following (It is RAN1 common understanding that combination of below codes is not precluded, and Outer erasure code is not precluded): Low-Density Parity-Check (LDPC) code, Polar code, Convolutional code (LTE and/or enhanced convolutional coding), and Turbo code (LTE and/or enhanced turbo coding).

Selection of 5G new RAT channel coding scheme(s) may consider: Performance, Implementation complexity, Latency (Decoding/Encoding), and Flexibility (e.g., variable code length, code rate, HARQ (as applicable for particular scenario(s))).

It has not been discussed how any form of signaling as to how to design signaling to use these codes.

What is needed, and an object and advantage of the technology disclosed herein, are improved apparatus, methods, and techniques for rateless codes.

SUMMARY

Described herein are apparatus and method for use of raptor codes, a class of so-called "rateless codes" or Fountain Codes, for a 3GPP New Radio ("NR"). These codes have the property that they are technically "rateless," that is, in principle they can be transmitted an infinite number of times or until the message is successfully decoded. These raptor codes may significantly reduce signaling overhead for NR compared to LTE, e.g., for delay tolerant mMTC traffic, for delay tolerant eMBB traffic, for uplink (UL) grants, for HARQ-ACK procedures, and for channel quality indicators (CQI).

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, 13, and thereafter), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN) or New Radio (NR).

The technology disclosed herein concerns rateless outer erasure codes (such as Raptor codes), including rateless codes suitable for in use 3GPP New Radio (NR), such as for uplink delay tolerant transmission. These rateless outer erasure codes have the potential to significantly reduce signaling overhead for NR compared to Long Term Evolution (LTE). One example of use is for delay tolerant massive Machine Type Communications (mMTC) traffic, but other example uses include delay tolerant enhanced Mobile Broadband (eMBB) traffic as well, e.g., in video download applications.

Thus, one form of erasure codes that has gained popularity in recent years are rateless or Fountain Codes, and in particular Raptor Codes (which is a type of Fountain Code). These codes transmit codewords according to a distribution and have the property that transmitted "pieces" of codewords XORed together may be used to regenerate the original message or source bits (i.e., the thing one wants to forward error correction code). In some variations of Raptor Codes, the decoding time of the erasure code approaches a constant, and can be in effect decoded based on an accumulation of the soft received bits.

As described and encompassed herein, the uplink (UL) grant mechanism of LTE may be changed if a rateless code is employed, as well as the HARQ-ACK procedure (which may mostly goes away), and the channel quality indicator (CQI).

Figure 1:
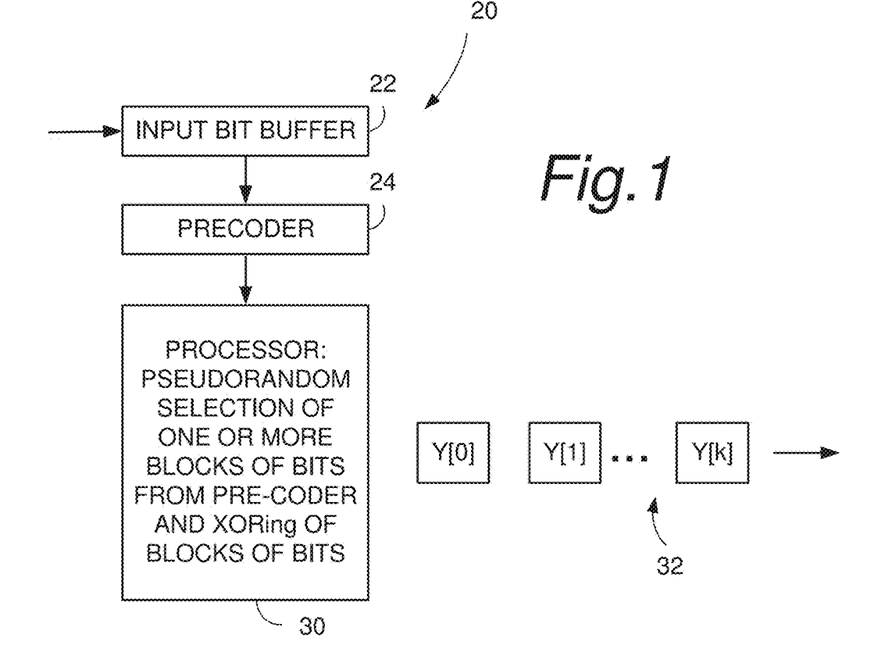
FIG. 1 is a diagrammatic view showing an example, non-limiting embodiment of an encoding system.

FIG. 1 shows various example, representative, non-limiting components and functionalities herein pertinent to an encoding system 20 that may be used in conjunction with raptor codes.

Message/Source bits are received and stored in an Input Bit Buffer 22. After receipt, these Message/Source bits are precoded by precoder 24, typically using a form of block code, for example a Low Density Parity Check Code, Polar Code, Reed Solomon Code or even a trellis code with tail-biting (e.g., a convolutional code or a turbo-code as used in LTE). This part of the system 20 may comprise the Forward Error Correction (FEC) "inner code" of a NR system. The precoder 24 then outputs blocks of bits (which are not necessarily equal to the output code rate, but rather may be equal to the input bit buffer or length of source bits or slightly larger) to processor 30. In processor 30 the blocks of bits are then, for each time period, pseudorandomly grouped into groups of one or more blocks of bits, and then the groups are XORed. If there is only one block there is no XOR operation.

The blocks of Raptor Coded bits output from processor 30 may form a sequence of output rateless codewords Y[0], Y[1], Y[k], which may be output to channel 32. This sequence of output rateless codewords Y[0], Y[1], Y[k] in effect may represent redundancy versions of the transmission. Depending on the signal to interference and noise ratio (SINR), one or more groups of the {Y[k]} blocks of bits will be sufficient to decode the original Message/Source bits, after decoding of the Precoder 24. For delay tolerant traffic at reasonable SINRs this is a far more efficient use of the channel 32 than the repetition schemes that are present in the current LTE coding table.

Figure 2:
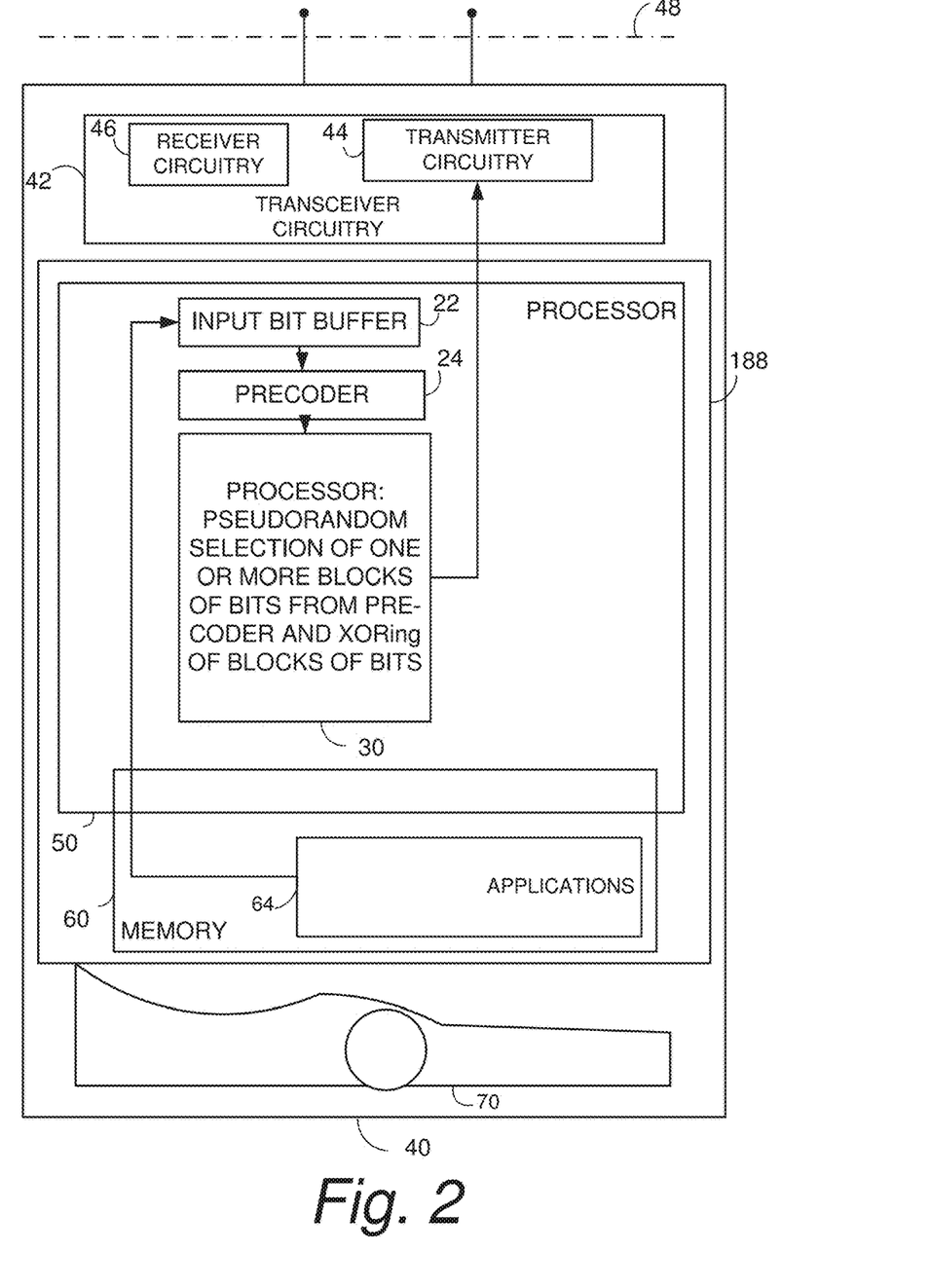
FIG. 2 is a schematic view of an example embodiment of a wireless terminal or UE which may comprise the encoding system of FIG. 1.

In an example embodiment the encoding system 20 may be implemented in a wireless terminal, e.g., UE, such as UE 40 shown in FIG. 2. The UE 40 comprises transceiver circuitry 42, which in turn comprises transmitter circuitry 44 and receiver circuitry 46 for communicating over radio interface 48. The transceiver circuitry 42 includes antenna (e) for UE 40. Transmitter circuitry 44 includes, e.g., amplifier(s), modulation circuitry and other conventional transmission equipment. Receiver circuitry 46 comprises, e.g., amplifiers, demodulation circuitry, and other conventional receiver equipment.

The UE 40 further comprises processor circuitry, also herein known more simply as processor 50. In addition to the processor circuitry 50, UE 40 also comprises memory 60 (e.g., memory circuitry) which may store an operating system and various application programs 64. The memory 60 may be any suitable type of memory, e.g., random access memory (RAM), read only memory (ROM), cache memory, processor register memory, or any combination of one or more memory types. The applications 64 such comprise instructions executable by processor circuitry 50 and are stored in non-transient portions of memory 60.

The UE 40 further comprises user interface(s) 70. The user interfaces 70 may comprise one or more suitable input/output devices which are operable by a user. Some of all of the user interfaces 70 may be realized by a touch sensitive screen. The user interface(s) 50 may also comprise a keyboard, audio input and output, and other user I/O devices. Only a portion of the user interfaces 70 is depicted in FIG. 1, it being understood that the user interfaces 70 may be provided on a cover or case of wireless terminal 50 and thus may visibly obscure the underlying other components shown in FIG. 1.

Figure 3:
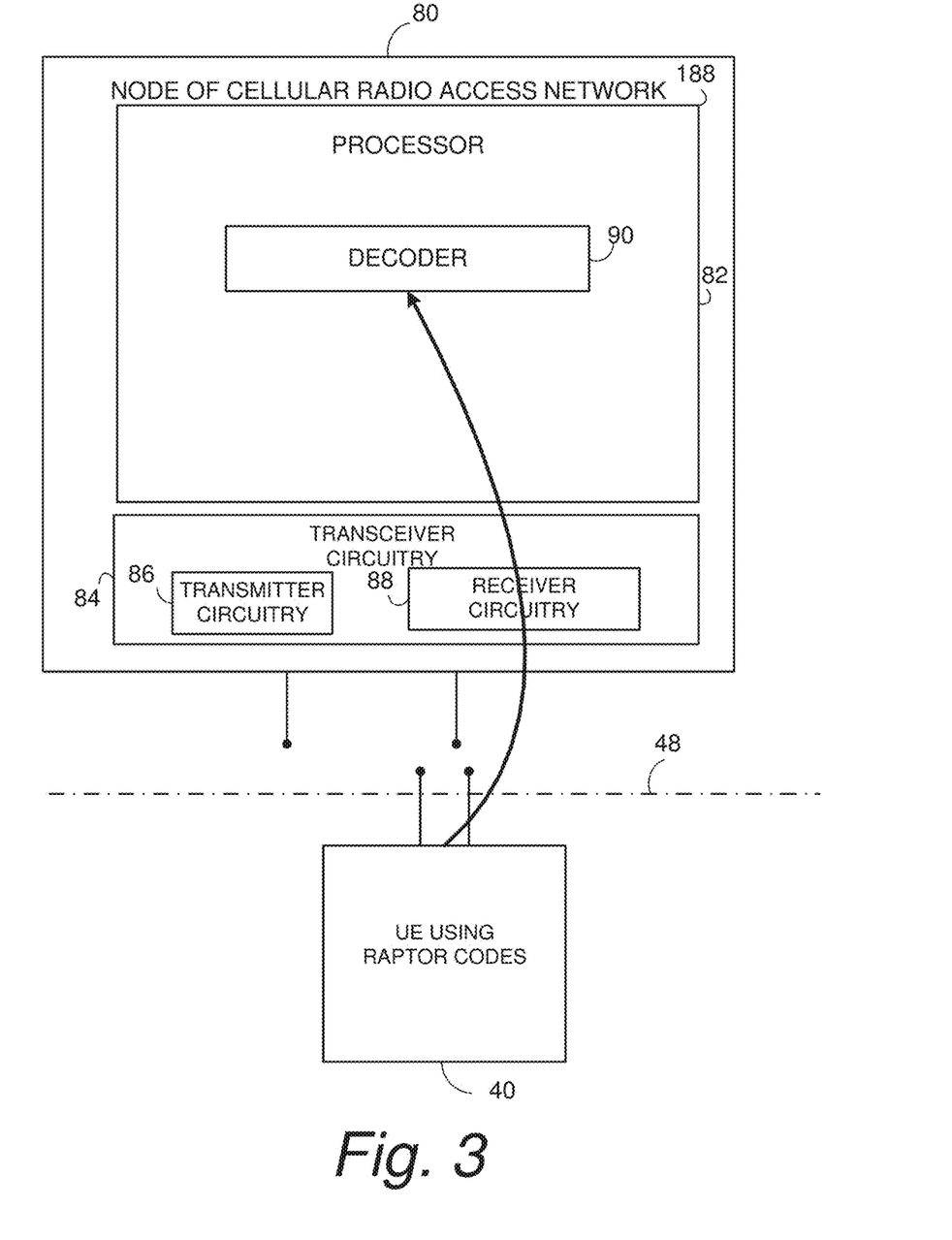
FIG. 3 is a schematic view of an example embodiment of a base station node which may receive signals for information encoded by the encoding system included in a UE such as that of FIG. 2.

FIG. 3 shows an example embodiment of a base station node 80 which may receive signals for information encoded by the encoding system included in a UE such as that of FIG. 2. The node 80 may be a base station node or another wireless terminal. Examples of a base station node include a Node B ("NB"), an enhanced Node B ("eNB"), a home eNB ("HeNB"), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, and thereafter), the scope of the present disclosure should not be limited in this regard. At least some aspects of the systems and methods disclosed herein may be utilized in other types of wireless communication systems.

The node 80 comprises processor circuitry 82 and transceiver circuitry 84. The transceiver circuitry 84 in turn comprises transmitter circuitry 86 and receiver circuitry 88. The processor circuitry 82 comprises decoder 90.

The pseudorandom number generator that determines the bit blocks to be combined in the "Pseudorandom selection, etc." block in FIG. 1, e.g., in processor 30, is known to the receiver (the node 80) and the transmitter (the UE 40), and that the sequence pseudorandom numbers can be synchronized between the UE 40 and the node 80. This synchronization can be done in the manner in which scrambling is done currently in LTE.

At the node 80, the receiver, e.g., decoder 90, may decode the soft received bits based on knowledge of the equations of which blocks of codewords were XORed together. Only a finite number of blocks need to be received in order to receive the message according to a fixed probability of receiving the message.

Figure 4:
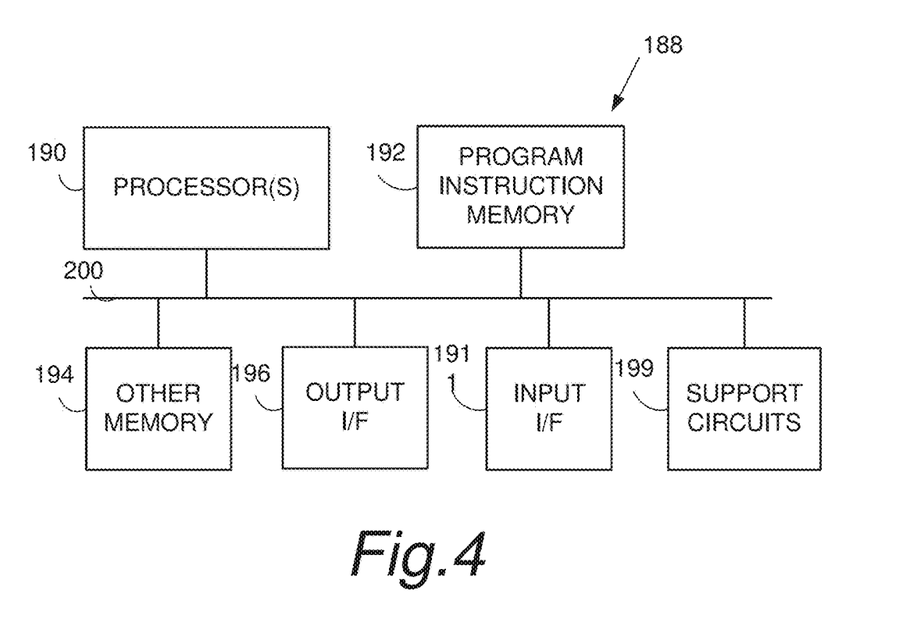
FIG. 4 is a diagrammatic view showing example elements comprising electronic machinery which may comprise a wireless terminal according to an example embodiment and mode.

Certain units and functionalities of UE 40 may be implemented by terminal electronic machinery 188. FIG. 4 shows an example of such electronic machinery 188 as comprising one or more processors 190, program instruction memory 192; other memory 194 (e.g., RAM, cache, etc.); input/output interfaces 196; peripheral interfaces 198; support circuits 199; and busses 200 for communication between the aforementioned units. The processor(s) 190 may comprise the processor circuitries described herein, for example. The memory 194 or computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory 60 shown in FIG. 1. The support circuits 199 are coupled to the processors 190 for supporting the processor in a conventional manner. These circuits include cache, power supplies, clock circuits, input/output circuitry and subsystems, and the like.

With such system 20 as herein described, as incorporated for example in a UE, several important paradigms of LTE are either no longer needed or their functionality is greatly simplified:

1. "NT persistent grant" with Buffer Status Report (BSR) replaces the semi-persistent scheduling being proposed for latency reduction or the SR/Grant mechanism.
2. HARQ-ACK can be replaced by implicit A/N.

3. CQI is greatly reduced because the "coding scheme" is now in effect implicit in the transmission.

Below each of these aspects are individually considered:

1. "NT persistent grant" with Buffer Status Report (BSR)

In one scheme being considered for specification for LTE, a UE sends a Schedule Request (SR); this is followed by a semi-persistent scheduled uplink grant.

The technology disclosed herein may replace this semi-persistent scheduled uplink grant with an "$N_T$ persistent grant"; (see HARQ-ACK simplification below) this has the benefit of giving greater scheduling flexibility.

2. HARQ-ACK Simplification

This is achieved as follows:

It is assumed that there is a mechanism, akin to LTE, wherein uplink grants are provided by a New Radio Downlink Control Channel (NRDCCH)

The NRDCCH signals to the UE an uplink grant (i.e., permission to transmit on specified time/frequency resources). This may be done in response to a schedule request (SR) sent by the UE, or may be done autonomously by the NRDCCH The NRDCCH sends an uplink grant, wherein the uplink grant contains Downlink Control Information (DCI), which implies transmission of a "$N_T$ persistent grant" indicating the transmission of up to K time/frequency/ and/or spatial resources for the transmission of $N_T$ rateless code codeword segments (e.g. $N_T$-time repetitions with same or different redundancy versions).

The K time/frequency/spatial resources are sufficient to transmit the $N_T$ rateless codeword segments exactly once for each codeword segment.

The UE monitors the NRDCCH, and when it sees an UL grant with a New Data Indicator (NDI)=1, which may be before the K time/frequency/ and/or spatial resources are completely used (or equivalently before the $N_T$ rateless code codeword segments are completely transmitted):

The UE may then, if the UL grant is a new $N_T$ persistent grant, commence transmitting a new sequence of $N_T$ rateless codeword segments corresponding to a new Message/Source bits.

If the UE receives a new UL grant, and the NDI=0, after transmission of the $N_T$ rateless codeword segments and there is a new $N_T$ persistent grant the UE drops the packet or retransmits the original signaling based on UE configuration (the NR equivalent of RRC signaling in LTE or other downlink control signaling, e.g., a DCI format that indicates what would be in LTE a new UE configuration.

Therefore, no Physical HARQ indicator channel is needed

Moreover, the NDI need not be timed 4 ms after a transmission of a $N_T$ rateless codeword segment. The NDI can be sent immediately (or within a time period based on processing in the eNB) based on the UL grant.

3. CQI Overhead Reduction

In LTE, an MCS table is used to convey to the UE what sort of modulation and coding scheme is required. In the scheme disclosed here, using a rateless code based on a base precode (an FEC code), there is no need to signal a coding scheme. In LTE, the "traditional" CQI table needs 5 bits to transmit an entry in the table; for the Narrowband Internet of Things (NBIoT) 4 bits are needed due to reduced numbers of modulation and coding schemes envisioned for that specification.

For the scheme disclosed here, 2 bits should suffice for delay tolerant mMTC transmission, corresponding only to data modulations (e.g., in one embodiment, only BPSK, QPSK, and 16QAM are used). Even if all LTE data modulations are used, no more than 3 bits need be used.

Instead one need only transmit the value $N_T$ to be used; this need only be transmitted once or it may be configured.

In another embodiment, no CQI entries are transmitted explicitly at all from the eNB, but rather, the UE may infer the data modulation from the time/frequency/ space resources allocated for the transmission of $N_T$ rateless codeword segments.

The technology disclosed herein includes the following, non-limiting features and advantages, particularly for New Radio (NR):

An alternative to transmission in time of successive "rateless codewords," such transmissions might be transmitted spatially, using uplink MIMO transmission modes.

The use of a code with properties akin to Raptor codes as outer erasure codes, using an LDPC code as pre-code.
This code can be used as an FEC code with or without a rateless outer coding.

The use of a code with properties akin to Raptor codes as outer erasure codes, using a Polar code as pre-code.
This code can be used as an FEC code with or without a rateless outer coding.
Benefit is potential for easy scalability.

The use of a code with properties akin to Raptor codes as outer erasure codes, using a Reed-Solomon code as pre-code.
Benefit is well known coding/decoding properties
As RS-codes are systematic The use of signaling to instantiate the use of the outer rateless code:
Signaling may be done via higher layers, e.g., RRC signaling or other (pre)configuration
Signaling would include the number of transmissions from the rateless The use of an "$N_T$ persistent grant" indicating the transmission of up to $N_T$ rateless code codeword segments; the value of $N_T$ may be determined from looking at the pattern of transmissions from a UE indicating the distribution of rateless code codewords required for successful demodulation.
Alternatively, it may be inferred from transmit power as well as a Sounding Reference Signal (SRS) transmission.
Alternatively, a "large" value $N_{T0}$ may be assumed on a first transmission of data, with subsequent values of $N_T$ determined from historical transmission success (i.e., the number of codewords it takes to successfully transmit the message/source bits).

The signaling of the value of $N_T$ may be done in DL control signaling, or if the duty factor of the transmission of the data is low, it may be configured to a "large" value $N_{T0}$.

For delay tolerant traffic, signaling consisting of ACK/ NACK via New Data Indicator in a downlink control signal with the value 1 when the message is successfully decoded after $N_T$ transmissions, 0, when it is successfully decoded after $N_T$ transmissions.

The use of a modulation only table replacing the MCS table of LTE, of 2 bits, indicating one of BPSK, QPSK, 16QAM or 64QAM.

The use of spatial transmission modes where a plurality of rateless code codewords are transmitted on multiple spatial degrees of freedom.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 40 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of a wireless terminal and a base station, so that, for example, operation of these entities may occur more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A node of a radio access network comprising:
processor circuitry configured to generate a $N_T$ persistent grant message which permits the wireless terminal to transmit $N_T$ number of rateless codeword segments representing redundancy versions of a transmission of a wireless terminal;
a transmitter configured to transmit the $N_T$ persistent grant to the wireless terminal;
wherein the processor circuitry is further configured to generate a new data indicator which indicates that the wireless terminal transmits a new sequence of $N_T$ rateless codeword segments corresponding to new message/source bits; and
wherein the processor circuitry is configured to generate the new data indicator before a K number of resources of a previous grant have been completely used.

2. The node of claim 1, further comprising a receiver configured to receive a schedule request from a wireless terminal, and wherein the $N_T$ persistent grant is generated in response to the schedule request.

3. The node of claim 1, wherein the processor circuitry is configured to autonomously generate the $N_T$ persistent grant.

4. The node of claim 1, wherein the processor circuitry is further configured to include the new data indicator in a new $N_T$ persistent grant.

5. The node of claim 1, wherein the processor circuitry is further configured to generate the $N_T$ persistent grant message to indicate that K number of resources are used for transmission of the $N_T$ number of rateless codeword segments.

6. The node of claim 1, wherein the processor circuitry is configured to determine the $N_T$ number in the $N_T$ persistent grant based on a pattern of transmissions from the wireless terminal.

7. The node of claim 1, wherein the processor circuitry is configured to determine the number $N_T$ in the persistent grant based on transmit power of the wireless terminal.

8. The node of claim 1, wherein the processor circuitry is configured to determine the number $N_T$ in the persistent grant based on a Sounding Reference Signal (SRS) transmission.

9. The node of claim 1, wherein the processor circuitry is configured to determine the number $N_T$ in the persistent grant based on historical transmission success of the wireless terminal.

10. The node of claim 1, wherein the processor circuitry is configured to dynamically determine the number $N_T$ in the persistent grant.

11. The node of claim 1, wherein the processor circuitry comprises a decoder which is configured to decode codewords as having been coded using a code with properties of Raptor codes as outer erasure codes and using an LDPC code as pre-code.

12. The node of claim 1, wherein the processor circuitry is further configured, in lieu of transmitting a Modulation and Coding Scheme (MCS) table comprising both modulation type and coding scheme, to transit to the wireless terminal a modulation type.

13. A wireless terminal comprising:
transmitter circuitry configured to transmit a schedule request to a node of a radio access network;
a receiver configured to receive from the node a $N_T$ persistent grant message which permits the wireless terminal to transmit $N_T$ number of rateless codeword segments representing redundancy versions of a transmission of the wireless terminal;
a processor configured to generate the $N_T$ number of rateless codeword segments;
a transmitter configured to transmit the $N_T$ number of rateless codeword segments to the node,
wherein the processor circuitry is further configured to receive from the node a new data indicator which indicates that the wireless terminal may transmit a new sequence of NT rateless codeword segments corresponding to new message/source bits; and
wherein the $N_T$ persistent grant message indicates to the wireless terminal that K number of resources are used for transmission of the $N_T$ number of rateless codeword segments.

14. The wireless terminal of claim 13, wherein when the new data indicator is received before the K number of resources of a previous grant have been completely used, the wireless terminal begins transmission of the new sequence of $N_T$ rateless codewords corresponding to the new message/source bits, thereby obviating need of a physical HARQ indicator channel.

15. The wireless terminal of claim 13, wherein the processor circuitry comprises an encoder which is configured use a code with properties of Raptor codes as an outer erasure code and to use an inner coding unit configured to use an LDPC code as pre-code.

16. The wireless terminal of claim 13, wherein the receiver circuitry is further configured, in lieu of receiving a MCS table comprising both modulation type and coding scheme, to receive from the node modulation type.

* * * * *